US011772296B2

(12) United States Patent
Fontana

(10) Patent No.: US 11,772,296 B2
(45) Date of Patent: Oct. 3, 2023

(54) UTILIZING A FENCE ASSEMBLY THAT PROVIDES SURFACES AT DIFFERENT ANGLES

(71) Applicant: Scott Fontana, Worcester, MA (US)

(72) Inventor: Scott Fontana, Worcester, MA (US)

( * ) Notice: Subject to any disclaimer, the term of this patent is extended or adjusted under 35 U.S.C. 154(b) by 0 days.

(21) Appl. No.: 17/500,234

(22) Filed: Oct. 13, 2021

(65) Prior Publication Data

US 2022/0118641 A1 Apr. 21, 2022

Related U.S. Application Data

(60) Provisional application No. 63/092,169, filed on Oct. 15, 2020.

(51) Int. Cl.
| | | |
|---|---|---|
| *B27B 27/06* | (2006.01) | |
| *B27B 27/10* | (2006.01) | |
| *B23D 47/04* | (2006.01) | |
| *B23D 45/04* | (2006.01) | |

(52) U.S. Cl.
CPC ............ *B27B 27/06* (2013.01); *B23D 45/044* (2013.01); *B23D 47/04* (2013.01); *B27B 27/10* (2013.01); *Y10T 83/762* (2015.04); *Y10T 83/7697* (2015.04); *Y10T 83/8773* (2015.04)

(58) Field of Classification Search
CPC ......... B27B 27/02; B27B 27/06; B27B 27/10; Y10T 83/7697; Y10T 83/8773; Y10T 83/762; Y10T 83/7788; Y10T 83/7647; Y10T 83/7613; B23D 47/04; B23D 45/044

See application file for complete search history.

(56) References Cited

U.S. PATENT DOCUMENTS

| | | | | |
|---|---|---|---|---|
| 415,940 | A * | 11/1889 | Lewis ...................... | B27G 5/02 83/767 |
| 752,406 | A * | 2/1904 | Nichols .................... | B27G 5/02 83/766 |
| 1,169,671 | A * | 1/1916 | Nihlen .................... | B25B 5/142 269/41 |
| 4,745,834 | A * | 5/1988 | Neumann ............ | B23D 47/025 83/522.18 |

(Continued)

FOREIGN PATENT DOCUMENTS

WO    WO-2008050326 A1 *  5/2008  ............... B27G 5/02

OTHER PUBLICATIONS

Retreived fromt the internet on Sep. 1, 2022; https://www.facebook.com/KizenEnterprise.

*Primary Examiner* — Laura M Lee
(74) *Attorney, Agent, or Firm* — BainwoodHuang

(57) ABSTRACT

Techniques utilize a fence assembly which includes a fence member constructed and arranged to (i) install on a saw base and (ii) provide a first surface that restricts movement of an object in a first direction when the fence member is installed on the saw base. The fence assembly further includes a stop member constructed and arranged to provide a second surface that restricts movement of the object in a second direction that is different from the first direction when the stop member is in a fixed position relative to the fence member. The fence member further includes positioning hardware constructed and arranged to position the stop member in the fixed position relative to the fence member. Actuation of the positioning hardware enables the stop member to be adjusted to accommodate different object for cutting.

16 Claims, 8 Drawing Sheets

(56) References Cited

U.S. PATENT DOCUMENTS

| | | | |
|---|---|---|---|
| 5,768,966 A * | 6/1998 | Duginske | B27B 25/10 144/253.1 |
| 5,845,555 A * | 12/1998 | Dawley | B23Q 16/006 83/467.1 |
| 6,481,320 B1 | 11/2002 | McGrory et al. | |
| 6,543,323 B2 | 4/2003 | Hayashizaki et al. | |
| 6,938,528 B2 * | 9/2005 | Lewis | B23D 47/04 269/319 |
| 7,111,537 B2 * | 9/2006 | Vallone | B27G 5/02 83/490 |
| 7,228,774 B2 | 6/2007 | Stolzer | |
| 8,020,477 B2 * | 9/2011 | Aoyama | B27B 27/04 83/490 |
| 8,191,449 B2 | 6/2012 | Wiezorek | |
| 8,621,970 B2 | 1/2014 | Lawlor et al. | |
| 8,661,954 B1 * | 3/2014 | Quayle | B27B 27/10 83/435.14 |
| 8,661,956 B2 * | 3/2014 | Thomas | B23D 45/044 83/471.3 |
| 9,707,633 B2 | 7/2017 | Agan et al. | |
| 9,833,924 B2 | 12/2017 | Gehret et al. | |
| 9,849,605 B2 | 12/2017 | Chang | |
| 10,081,118 B2 | 9/2018 | Hsu et al. | |
| 11,305,454 B2 * | 4/2022 | Shaw | B23D 45/044 |
| 11,554,513 B1 * | 1/2023 | Larsson | F21K 9/238 |
| 2002/0043296 A1 * | 4/2002 | Daniels | B27C 5/04 144/286.5 |
| 2003/0070522 A1 * | 4/2003 | Huang | B23D 47/025 83/474 |
| 2003/0228197 A1 * | 12/2003 | Salvaryan | B23D 47/04 407/30 |
| 2005/0241450 A1 * | 11/2005 | Schwartz | B27B 29/00 83/448 |
| 2005/0247177 A1 * | 11/2005 | Hetcher | B27G 19/02 83/490 |
| 2007/0137450 A1 * | 6/2007 | Nagyszalancy | B27B 27/08 83/13 |
| 2008/0250905 A1 * | 10/2008 | Khan | B27B 27/08 269/45 |
| 2012/0167738 A1 * | 7/2012 | Lawlor | B23D 47/04 83/471.3 |
| 2021/0078156 A1 * | 3/2021 | Hölderle | B25H 1/08 |
| 2022/0118641 A1 * | 4/2022 | Fontana | B27B 27/08 |
| 2022/0184719 A1 * | 6/2022 | Capaccioli | B23D 47/02 |

* cited by examiner

UTILIZING A FENCE ASSEMBLY THAT PROVIDES SURFACES AT DIFFERENT ANGLES

CROSS REFERENCE TO RELATED APPLICATIONS

This application is a regular utility application based on earlier-filed U.S. Application No. 63/092,169 filed on Oct. 15, 2020, entitled "UTILIZING A FENCE ASSEMBLY THAT PROVIDES SURFACES AT DIFFERENT ANGLES", the contents and teachings of which are hereby incorporated by reference in their entirety.

BACKGROUND

A conventional miter saw includes a miter saw table, a miter saw fence, and a miter saw blade. Typically, the miter saw table provides a horizontal surface and the miter saw fence provides a vertical surface that intersects the horizontal surface at 90 degrees.

To use the conventional miter saw, a human operator holds a piece of wood against the two surfaces, i.e., the horizontal surface provided by the miter saw table and the vertical surface the miter saw fence. The human operator then operates the miter saw blade to cut the wood piece while continuing to hold the wood piece against the two surfaces.

SUMMARY

Unfortunately, there are deficiencies to the above-described conventional miter saw. For example, it may be easy for the human operator to hold a block of wood against the two surfaces provided by the miter saw table and the miter saw fence while cutting the block since the block derives support where the two surfaces intersect at 90 degrees. However, it may be awkward and/or problematic for the human operator to hold a piece of wood that is not block-shaped (e.g., crown molding) against the miter saw table and the miter saw fence while cutting the piece since the piece may not be adequately supported where the two surfaces intersect at 90 degrees. In some instances, it may even be unsafe for the human operator to even attempt cutting piece of wood that is not block-shaped particularly if the human operator is not experienced (or is not well trained) in using the conventional miter saw or if the human operator is not holding the piece of wood steadily in place.

To address this issue, the human operator may hold the piece of wood in place for cutting using external clamps, vices, jigs, etc. However, this approach may be impractical (e.g., the task may be too time consuming, too complex due to the desired cut angle, etc.) particularly if there are many pieces to cut during a particular time window on a particular project (e.g., a large project to install crown molding).

In contrast to the above-described conventional miter saw which is difficult for a human operator to use when cutting pieces of wood that are not block-shaped, improved techniques are directed to utilizing a fence assembly that provides surfaces at different angles against which a user may easily maintain position of an object even if the object is not block shaped. In particular, the fence assembly in combination with a saw base (e.g., a flat foundation or stand that supports a motorized saw) may provide several different surfaces (e.g., three flat walls) against which the user may hold an object in place securely and without difficulty (e.g., with relatively little effort) before sawing the object.

One embodiment is directed to a fence assembly which includes a fence member constructed and arranged to (i) install on a saw base and (ii) provide a first surface that restricts movement of an object in a first direction when the fence member is installed on the saw base. The fence assembly further includes a stop member constructed and arranged to provide a second surface that restricts movement of the object in a second direction that is different from the first direction when the stop member is in a fixed position relative to the fence member. The fence member further includes positioning hardware constructed and arranged to position the stop member in the fixed position relative to the fence member.

Another embodiment is directed to a saw system which includes a saw base, an arm constructed and arranged to move (e.g., pivot) relative to the saw base to move a motorized saw relative to the saw base (e.g., to lower and raise the motorized saw relative to the saw base), and a fence assembly. The fence assembly has:

(A) a fence member constructed and arranged to install on the saw base and provide a first surface that restricts movement of an object in a first direction when the fence member is installed on the saw base, (B) a stop member constructed and arranged to provide a second surface that restricts movement of the object in a second direction that is different from the first direction when the stop member is in a fixed position relative to the fence member, and (C) positioning hardware constructed and arranged to position the stop member in the fixed position relative to the fence member.

Yet another embodiment is directed to method of sawing an object. The method includes:

(A) placing an object in communication with a saw base and a fence assembly, the fence assembly having:
  (i) a fence member installed on the saw base and providing a first surface that restricts movement of the object in a first direction,
  (ii) a stop member that restricts movement of the object in a second direction that is different from the first direction, and
  (iii) positioning hardware that positions the stop member in the fixed position relative to the fence member;

(B) starting a motorized saw; and (C) after the motorized saw is started, moving an arm that supports the motorized saw relative to the saw base to move (e.g., pivot) the motorized saw to saw the object.

In some arrangements, the method further includes:
  (i) after the motorized saw saws the object, actuating the positioning hardware relative to the stop member to move the stop member from the fixed position to another fixed position relative to the fence member; and
  (ii) placing another object in communication with the saw base and the fence assembly, re-starting the motorized saw and moving the arm that supports the motorized saw relative to the saw base to move the motorized saw to saw the other object.

Actuation of the positioning hardware enables the stop member to be adjusted to accommodate different objects for cutting (e.g., to adjust the height or distance between the saw base and the stop member). Such actuation may be repeated to cut a variety of objects of different geometries, sizes, etc.

In some arrangements, the method further includes, prior to placing the object in communication with the saw base and the fence assembly, installing the fence member on the saw base and actuating the positioning hardware to position (e.g., to hold) the stop member in the fixed position relative to the fence member.

In some arrangements, the positioning hardware is constructed and arranged to selectively (i) fasten (e.g., screw down) the stop member to the fence member to maintain the stop member in the fixed position relative to the fence member and (ii) unfasten (e.g., unscrew) the stop member from the fence member to permit the stop member to move out of the fixed position relative to the fence member.

In some arrangements, the fence member defines an edge that fits into a groove of the saw base (e.g., a slot and/or other attachment feature that enables the fence member to fasten to the saw base). Additionally, the fence member further defines a set of slots (or channels) that extend in a perpendicular direction from the edge, each slot of the set of slots being sized to receive at least a portion (e.g., a set of detents) of the stop member.

In some arrangements, the fence member provides, as the first surface, a first plane that extends perpendicularly from the saw base when the edge defined by the fence member is disposed within the slot of the saw base. Additionally, the stop member provides, as the second surface, a second plane that extends perpendicularly from the fence member when the positioning hardware positions the stop member in the fixed position relative to the fence member.

In some arrangements, the saw base defines a third plane. Additionally, when the fence member is disposed within the groove of the saw base and the stop member is positioned in the fixed position relative to the fence member, the second plane provided by the stop member faces the third plane.

In some arrangements, the stop member includes a bar portion (e.g., an elongated rectangular structure) that provides the second surface, and a set of engagement elements constructed and arranged to engage the set of slots defined by the fence member to restrict movement of the stop member relative to the fence member.

In some arrangements, the set of engagement elements of the stop member and the positioning hardware are constructed and arranged to operate as a clamping structure that secures the stop member in the fixed position relative to the fence member when the positioning hardware is actuated relative to the bar portion of the stop member.

In some arrangements, the fence assembly further includes:
(i) a second fence member (e.g., a reverse image of the first fence member) constructed and arranged to install on the saw base and provide an extension of the first surface that further restricts movement of the object in the first direction when the second fence member is installed on the saw base,
(ii) a second stop member constructed and arranged to provide an extension of the second surface that restricts movement of the object in the second direction that is different from the first direction when the second stop member is in a second fixed position relative to the second fence member, and
(iii) second positioning hardware constructed and arranged to position the second stop member in the second fixed position relative to the second fence member.

Other embodiments are directed to sawing processes, apparatus, componentry, and so on. Some embodiments are directed to various sawing methods, equipment and/or components which are involved in utilizing a fence assembly (or multiple fence assemblies) providing one or more surfaces at different angles.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to utilizing a fence assembly that provides surfaces at different angles against which a user may easily position an object even if the object is not block-shaped. In particular, the fence assembly in combination with a saw base (e.g., a flat base member that supports a motorized saw) may provide different surfaces against which the user may hold an object in place securely and without difficultly (e.g., by simply applying force in one direction) before sawing the object.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
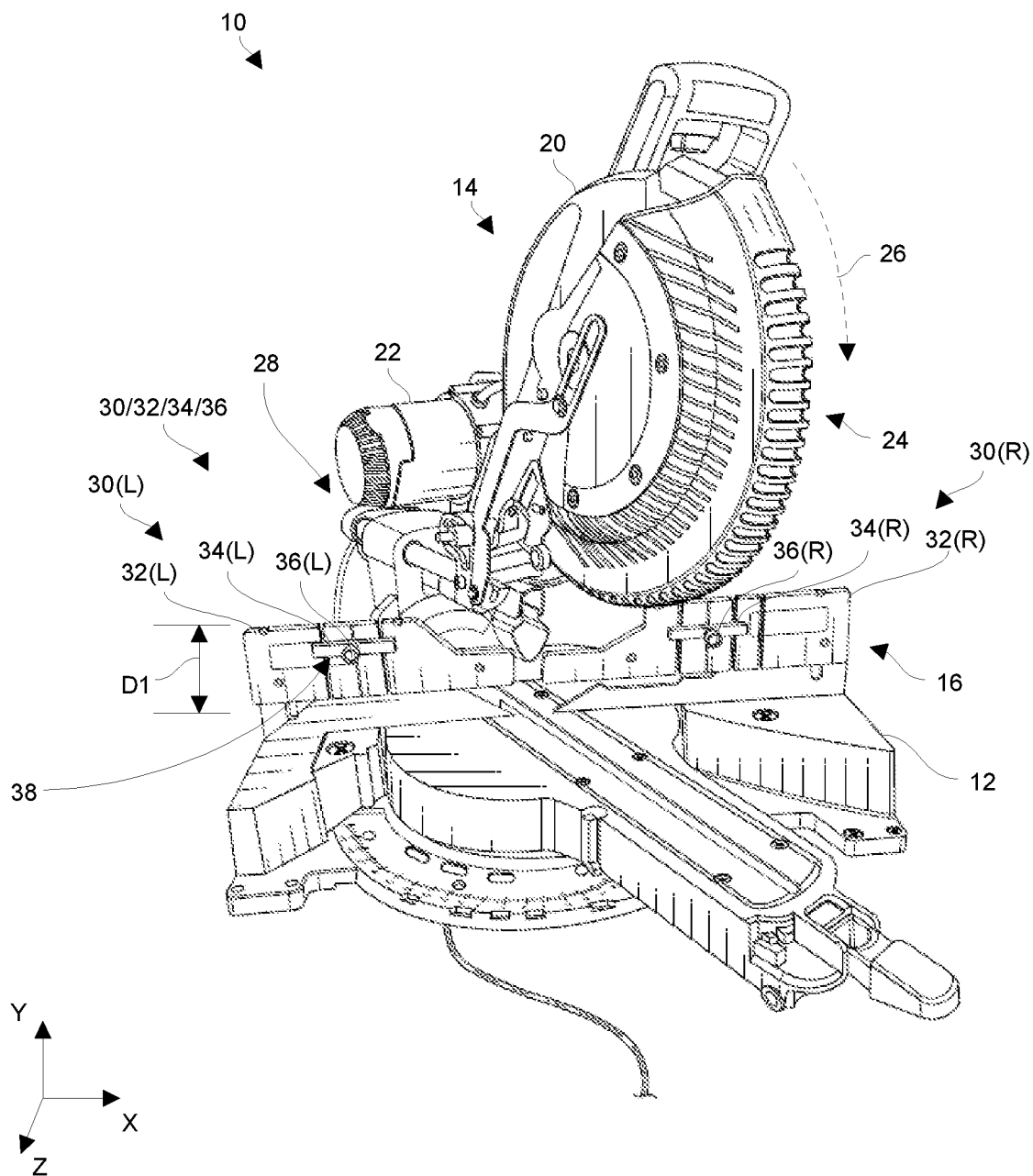
FIG. 1 is a perspective view of a saw system which utilizes a fence assembly that provides surfaces at different angles against which a user may easily position an object even if the object is not block-shaped in accordance with certain embodiments.

FIG. 1 shows a saw system 10 which utilizes a fence assembly that provides surfaces at different angles. The saw system 10 includes a saw base 12, an arm 14, and a fence assembly 16. By way of example only, the saw system 10 will be described in the context of a miter saw but it should be understood that other kinds of saws are suitable as well such as chop saws or cut-off saws, cold saws, other types of abrasive saws, and so on.

The saw base 12 is constructed and arranged to provide support for the arm 14 and the fence assembly 16. Additionally, the saw base 12 defines a flat surface or platform (see the X-Z plane in FIG. 1) on which a user may support an object for cutting.

The arm 14 includes a beam structure (or simply beam) 20, an electric motor 22, and a saw blade 24 (e.g., hidden behind a guard or shield). The beam 20 supports the electric motor 22 which is constructed and arranged to rotate the saw blade 24 in response to user operation (e.g., in response to a user pressing a button to provide electric power to the electric motor 22). The beam 20 is constructed and arranged to pivot relative to the saw base 12 in a manner that brings the saw blade 24 in contact with an object to saw the object (e.g., see the dashed arrow 26 in FIG. 1 illustrating movement of the beam 20 in the direction of the saw base 12). The beam 20 may be provisioned with a combination handle/button mechanism that enables the user to move the arm 14 and simultaneously start and/or stop the electric motor 22.

It should be understood that the saw base 12 and the arm 14 may be equipped with one or more specialized pivoting mechanisms 28 such as mounts, yolks, hinges, combinations thereof, etc. to enable the arm 14 to cut objects at various angles. Accordingly, the user is able to cut objects at different angles to form miters between objects (e.g., pieces of wood).

The fence assembly 16 includes a set of fences 30(L), 30(R) (collectively, fences 30). Each fence 30 includes a fence member 32, a stop member 34, and positioning hardware 36. That is, the fence 30(L) includes a fence member 32(L), a stop member 34(L), and positioning hardware 36(L). Likewise, the fence 30(R) includes a fence member 32(R), a stop member 34(R), and positioning hardware 36(R). In some arrangements, the fence member 32(L) is a reverse image of the fence member 32(R) (e.g., each fence member 32(L), 32(R) defines a portion of an opening that tapers towards the saw cutting area to enable the saw blade 24 to operate at angles other than 90 degrees).

Each fence 30 is constructed and arranged to install onto the saw base 12 (e.g., to insert into a groove within or otherwise become stationary relative to the saw base 12). Additionally, each fence 30 is constructed and arranged to provide multiple surfaces (or planar walls) against which the user may rest an object while sawing the object. In particular, for each fence 30, the positioning hardware 36 enables a user to control (or adjust) the position the stop member 34 relative to the fence member 32 thereby adjusting the distance (or height) D1 between the stop member 34 and the saw base 12.

It should be appreciated that the saw system 10 provides multiple surfaces that enable a user to easily position an object for cutting. In particular, the user may simply push the object toward the fence assembly 16 until the object wedges against surfaces. One surface is in the X-Y plane, i.e., a backstop for the object provided by each fence member 32. Another surface is in the X-Z plane facing the saw base 12, i.e., an upper detention surface or beam/wall that prevents the object from sliding and/or rocking in the upward direction beyond that surface provided by each stop member 34. Yet another surface is simply the X-Z plane provided by the saw base 12.

During operation, the user actuates the positioning hardware 36 of the fence assembly 16 to properly position the stop members 34 relative to the fence members 32 based on where and how the user wishes to cut an object. That is, the user sets the distance D1 (see FIG. 1). In some arrangements, the positioning hardware 36 includes a threaded twist tight knob with ridges and/or tabs to enable convenient grasping and maneuvering.

The user then places the object to be cut in communication with a saw base 12 and the fences 30. For example, suppose that the object is a piece of crown molding. With one hand, the user may rest one edge of the crown molding against the intersection 38 between a fence member 32 and a stop member 34 and simply apply pressure to the opposite edge of the crown molding in a manner that pushes the crown molding against the fences 30, the saw base 12, etc.

Once the object is in place, the user starts the motorized saw. In the example, with the other hand, the user operates the arm 14. Along these lines, the user may press a button to activate the motorized saw (see the electric motor 22 and the saw blade 24 in FIG. 1).

After the motorized saw spins up to a satisfactory cutting speed, the user pivots the arm 14 relative to the saw base 12 to lower the motorized saw to cut the object. After the object is cut, the user raises the arm 14 and waits for the motorized saw to stop spinning before removing the cut object. Further details will now be provided with reference to other figures.

Figure 2:
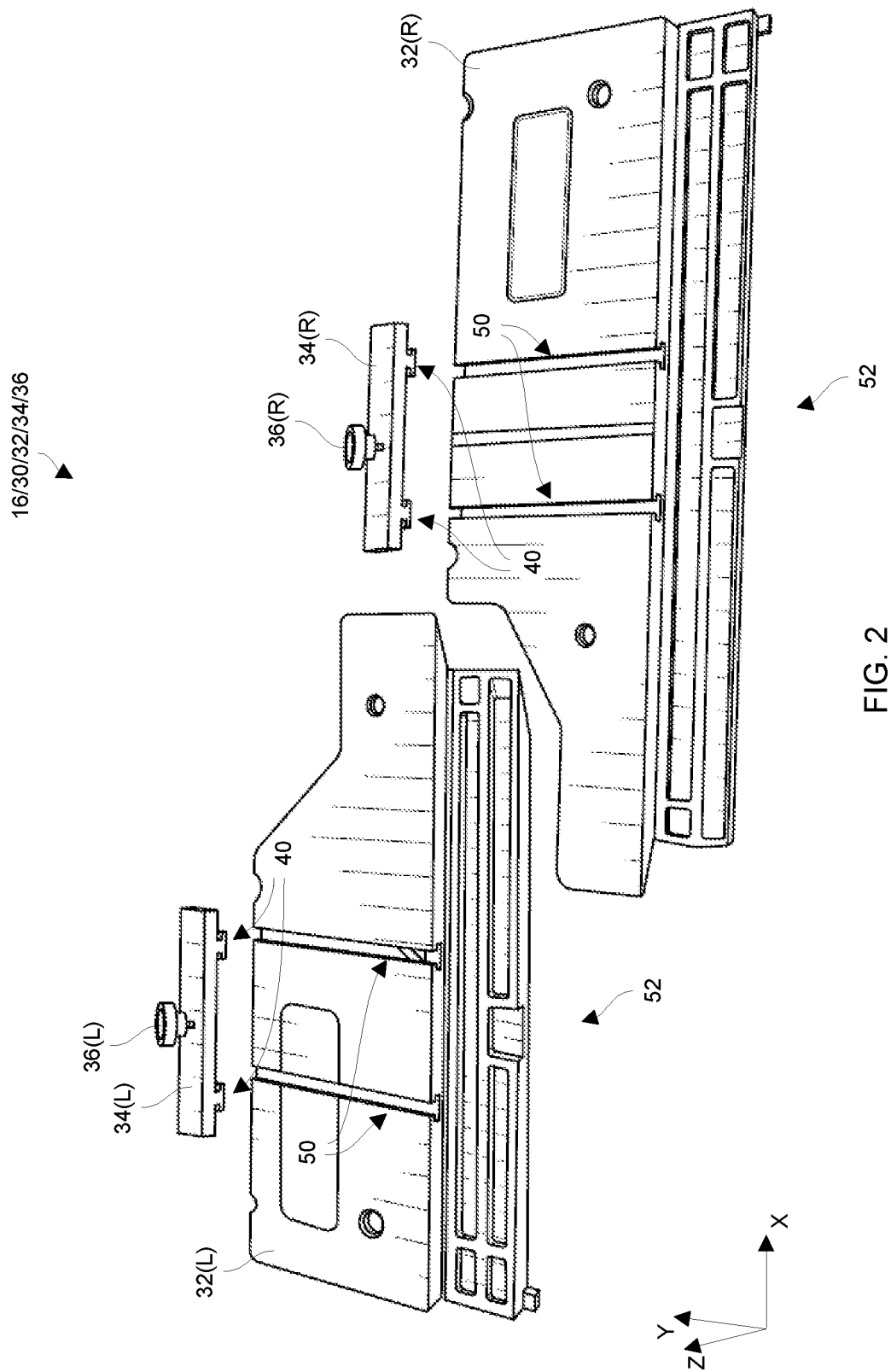
FIG. 2 is a partially exploded view of at least a portion of fence assembly in accordance with certain embodiments.
Figure 3:
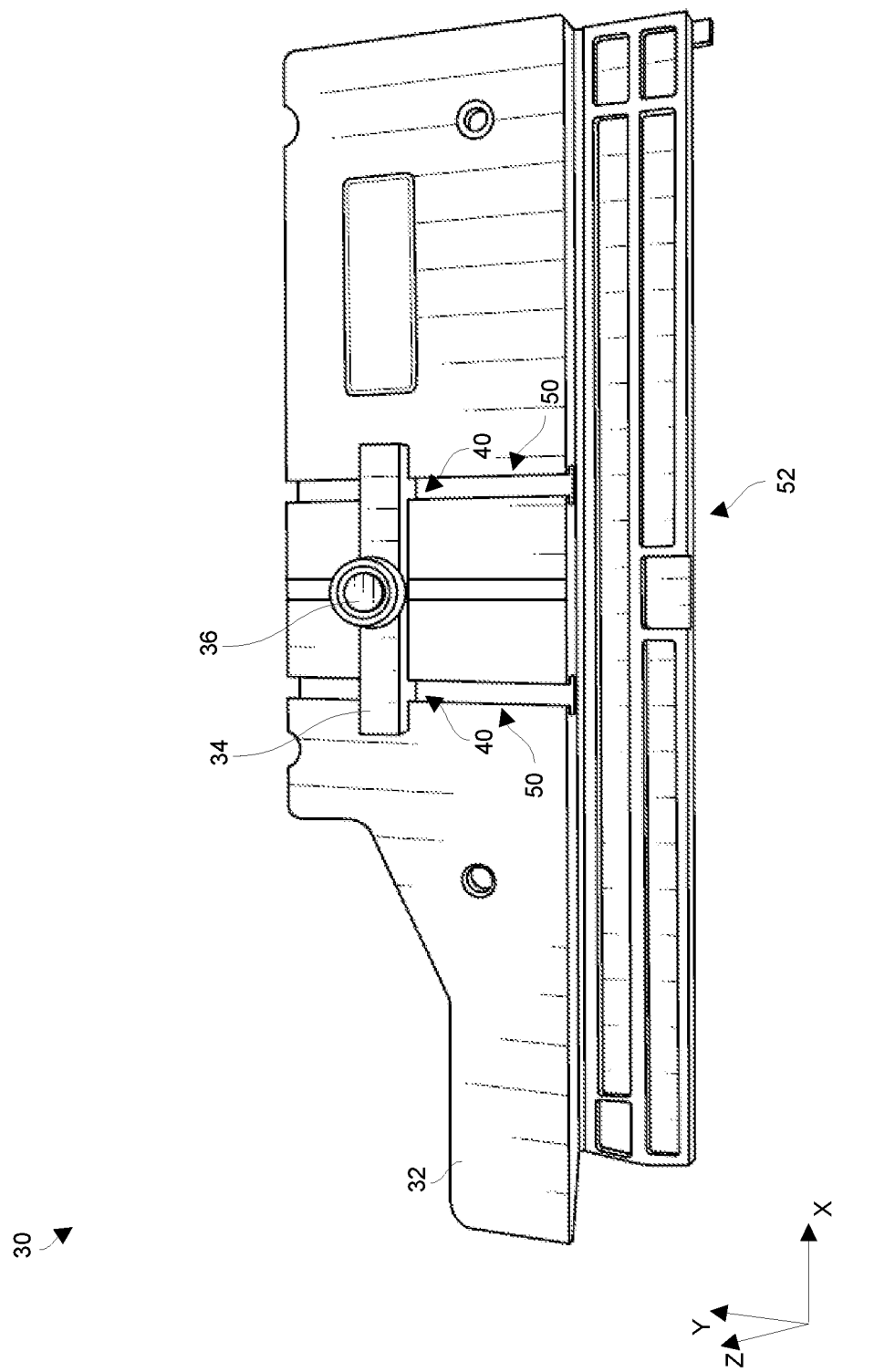
FIG. 3 is an assembled view of a portion of a fence assembly in accordance with certain embodiments.

FIGS. 2 and 3 show further details of the fence assembly 16 in accordance with certain embodiments. FIG. 2 shows a perspective front view of the fences 30(L), 30(R) in a partially disassembled state. FIG. 3 shows a perspective front view of a fence 30 (e.g., the fence 30(R)) in an assembled state.

As best seen in FIG. 2, each stop member 34 defines a set of engagement elements 40. Each engagement element 40 may take the form of a detent, a tab, or a rail section with a T-shaped cross-section (and/or similar fastening structure). The set of engagement elements 40 extend from one side of an elongated bar member (e.g., a bar having a square cross-section).

Additionally, each fence member 32 defines a set of slots (or channels) 50 that extends along the Y-axis and corresponds to the set of engagement elements 40. The engagement elements 40 of a stop member 34 fit within respective slots 50 (see FIG. 3) to control guiding of the stop member 34 as well as form part of a clamping structure which holds the stop member 34 in place relative to the fence member 32 in response to operation of the positioning hardware 36. Accordingly, the user may adjust the stop member 34 up or down by releasing (or loosening) and then tightening the positioning hardware 36 (e.g., actuating a knob or a screw).

In accordance with certain embodiments, the set of slots 50 defined by a fence member 32 includes two slots 50 in the form of T-shaped grooves although other numbers of slots 50 are suitable for use (one, three, etc.). Additionally, each engagement element has a T-shaped cross section that enables the stop member 34 to slide relative to the stop member 34 (i.e., up and down along the Y-axis). Such a configuration allows the stop member 34 to translate vertically but keeps the elongated axis of the stop member 34 horizontal and parallel to the saw base 12 (FIG. 1).

If the user actuates the positioning hardware 36 (e.g., rotates a turnable knob which threads into the stop member 34) in one direction (e.g., clockwise), the positioning hardware 36 pushes against the fence member 32 to restrict movement of the stop member 34 relative to the fence member 32. Accordingly, the positioning hardware 36 holds the stop member 34 in a fixed position relative to the fence member 32 (e.g., via a friction fit).

If the user actuates the positioning hardware 36 in another direction (e.g., counterclockwise), the positioning hardware 36 no longer pushes against the fence member 32 thus enabling the stop member 34 to be guided by the set of engagement elements sliding within the set of slots. Accordingly, the user is now able to adjust the distance D1 (FIG. 1) between the stop member 34 and the fence member 32.

As further shown in FIGS. 2 and 3, the fence members 32 define bottom edges 52. Such bottom edges 52 define geometries that are well suited for mounting to the saw base 12 and/or for accommodating other components of the saw system 10. For example, in some arrangements, at least portions of the edges 52 insert into corresponding grooves or slots in the saw base 12. Additionally, in some arrangements, the edges 52 define geometries to accommodate other components, guides, mounting hardware, and so on.

The following figures show additional details of one or more embodiments. It should be understood that certain dimensions, scales, geometries may differ depending on the configuration of the saw.

Figure 4:
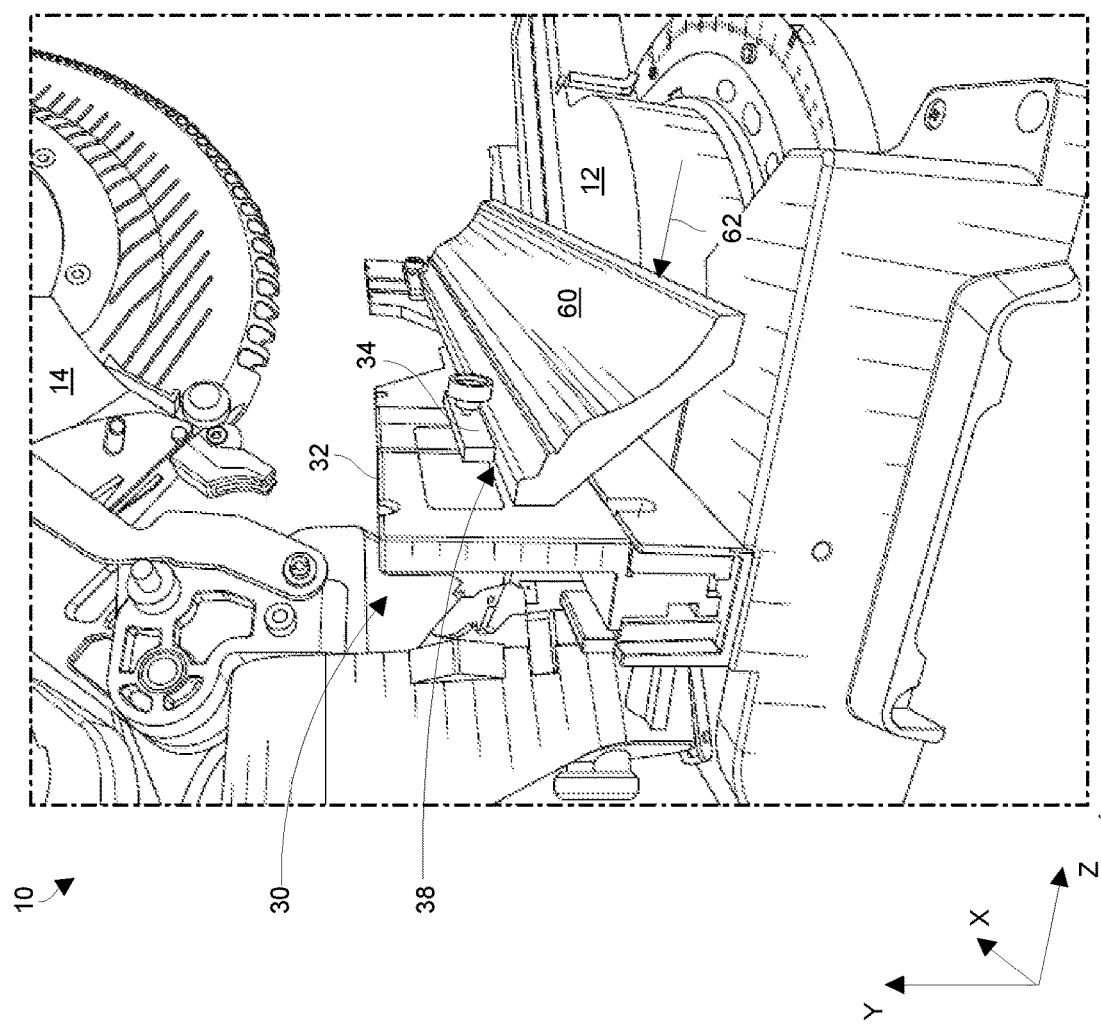
FIG. 4 is a perspective view of a saw system having a fence assembly prior to cutting an object in accordance with certain embodiments.
Figure 5:
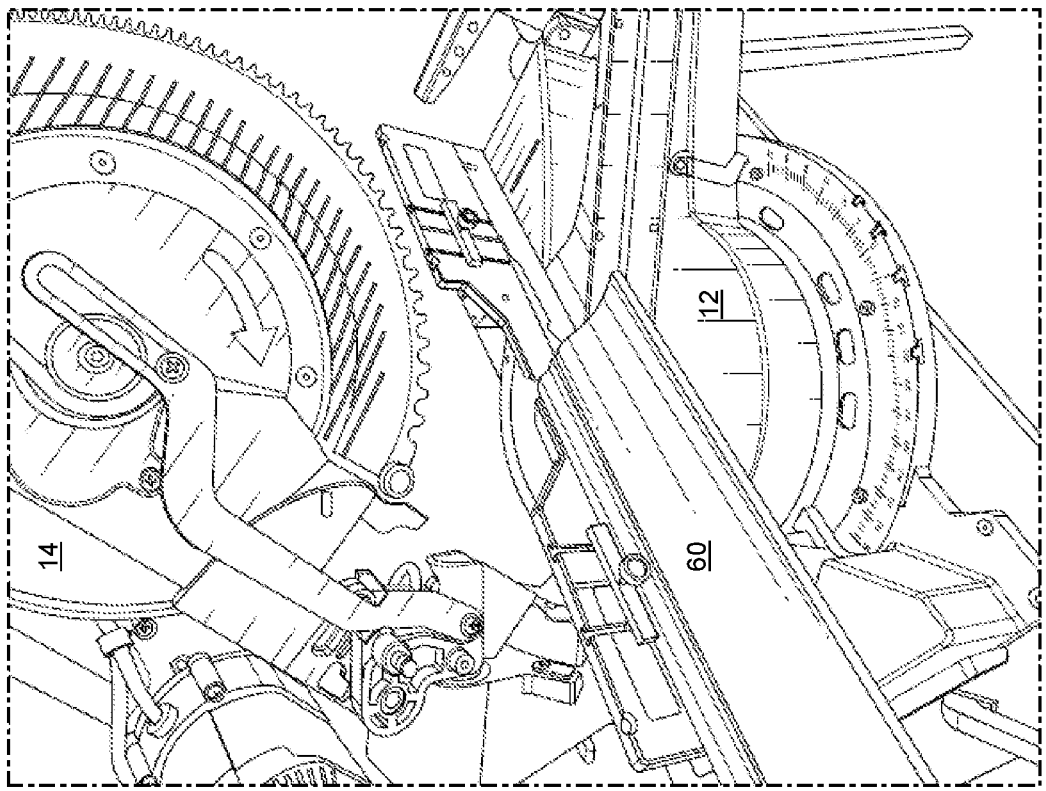
FIG. 5 is a perspective view of the saw system having the fence assembly after cutting the object in accordance with certain embodiments.

FIGS. 4 and 5 show perspective views of a saw system 10 which includes a fence assembly 16 in accordance with certain embodiments. As shown in FIG. 4, an object 60 is properly positioned for cutting. Here, the user may simply apply force in the negative Z-direction (arrow 62) on the bottom edge of the object 60 to push the object 60 toward the fence member 32. Accordingly, an upper edge of the object 60 contacts both the fence members 32 and the stop members 34 at their intersections 38. The participation of multiple fences 30 improves object stability. As a result, the top edge of the object 60 wedges uniformly and securely against both the fence member 32 and the stop member 34 of each fence 30 in manner that richly and reliably holds the object 60 in place during cutting.

As shown in FIG. 5, the object 60 has been cut by the saw system 10. In particular, the user was able to hold the object 60 against the saw base 12 and the fence assembly 16 with one hand while operating the arm 14 using the other hand to easily accomplish an effective miter cut.

It should be understood that the object 60 is illustrated in FIGS. 4 and 5 as a piece of crown molding by way of example. Other shapes, materials, etc. are suitable for use as well for the object 60.

Figure 6:
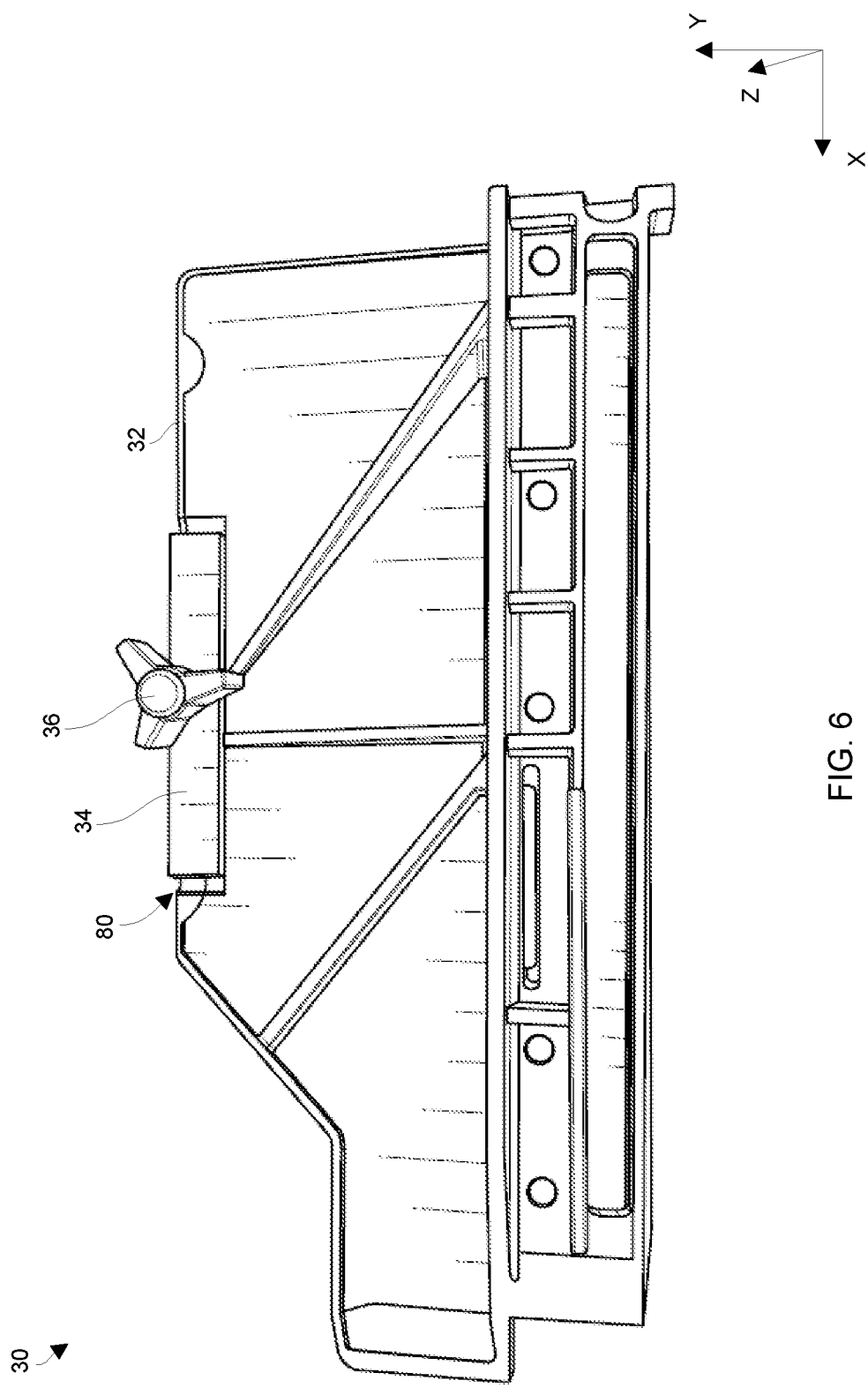
FIG. 6 is a backside view of a portion of a fence assembly in accordance with certain embodiments.
Figure 7:
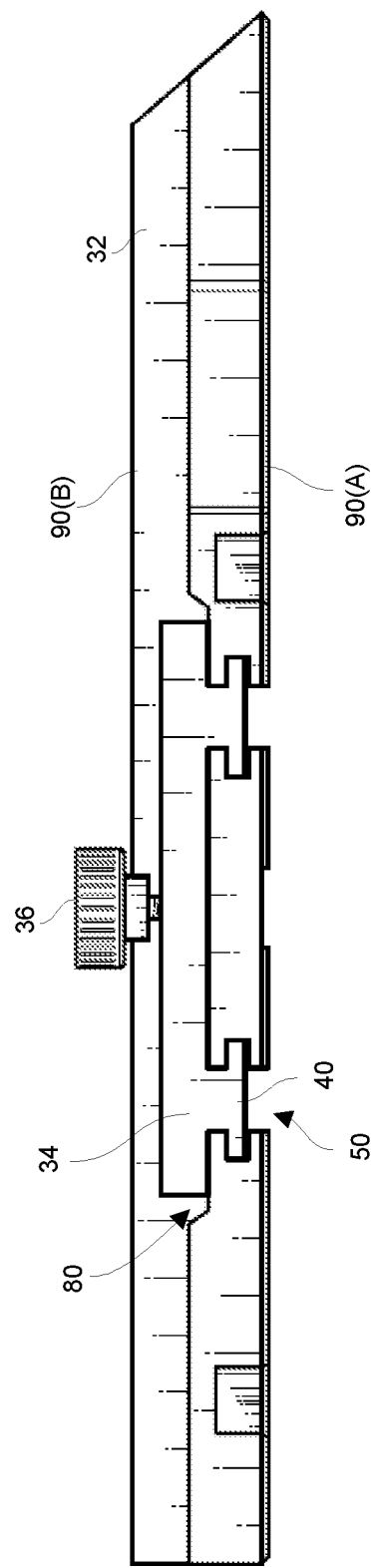
FIG. 7 is a top view of a portion of a fence assembly in accordance with certain embodiments.

FIGS. 6 and 7 show certain fence details in accordance with certain embodiments. FIG. 6 shows a backside view of a fence 30. FIG. 7 shows a top view of a fence 30. Although only a single fence 30 is shown in FIGS. 6 and 7 (e.g., the fence 30(L)), it should be understood that the same explanation applies to the both fences 30 (e.g., also to the fence 30(R)).

As shown in FIGS. 6 and 7, the fence member 32 of the fence 30 defines a stowing feature 80 (e.g., a recess or void area) within which the stop member 34 may be positioned when not needed (e.g., during a cut, when the fence assembly 16 is stored, etc.). Such a feature prevents component loss by allowing the user to store the stop member 34 and the positioning hardware 36 when the user does not wish to use the stop member 34 and the positioning hardware 36 to cut an object.

While the stop member 34 resides in a stored orientation within the stowing feature 80, the positioning hardware 36 is nevertheless tightened to hold the stop member 34 in place relative to the fencing member 32 in a manner similar to holding the stop member 34 to the fencing member 32 when in use (e.g., actuated in the positive Z-direction). That is, when the positioning hardware 36 is screwed down, the positioning hardware 36 pulls the stop member 34 in the opposite direction (e.g., in the negative Z-direction) creating a friction fit between the fence member 32 and the stop member 34. Accordingly, the positioning hardware 36 robustly and reliably holds the stop member 34 in a fixed position relative to the fence member 32 within the stowing feature 80. As a result, the stop member 34 remains readily available even if the user in not currently using the stop member 34 when cutting an object.

As mentioned earlier, the positioning hardware 36 may be untightened and re-tightened to re-position to the stop member 34 relative to the fence member 32. In order to move the stop member 34 from the out-of-use (or stowing) position in FIGS. 6 and 7 to an in-use position in FIGS. 4 and 5, (i) the positioning hardware 36 is loosened, (ii) the stop member 34 is moved fully out of the fence member 32, flipped, inserted back on to the fence member 32 as shown in FIGS. 4 and 5, and (iii) the positioning hardware 36 is re-tightened.

By way of example only, the positioning hardware 36 is shown as having tabs in FIG. 6 to show an optional detail that facilitates simple and easy turning of the positioning hardware 36. However, the positioning hardware 36 may have other configurations such as take the form of ridged knob as shown in FIG. 7.

It should be understood that FIG. 7 provides a view which is convenient for illustrating certain features. For example, the fence member 32 defines a front side 90(A) that faces the user and a rear side 90(B) that faces away from the user when the fence assembly 16 is installed on the saw base 12 and in operation (also see FIGS. 4 and 5).

Additionally, FIG. 7 shows that the slots 50, which extend into the page (i.e., the negative Y-direction), are accessible by the stop member 34 from both sides 90(A), 90(B). Along these lines, FIG. 7 shows T-shaped cross-sections of the engagement elements 40 of the stop member 34 and the accommodating geometries of the slots 50 that receive and control the engagement elements 40 in accordance with certain embodiments.

Figure 8:
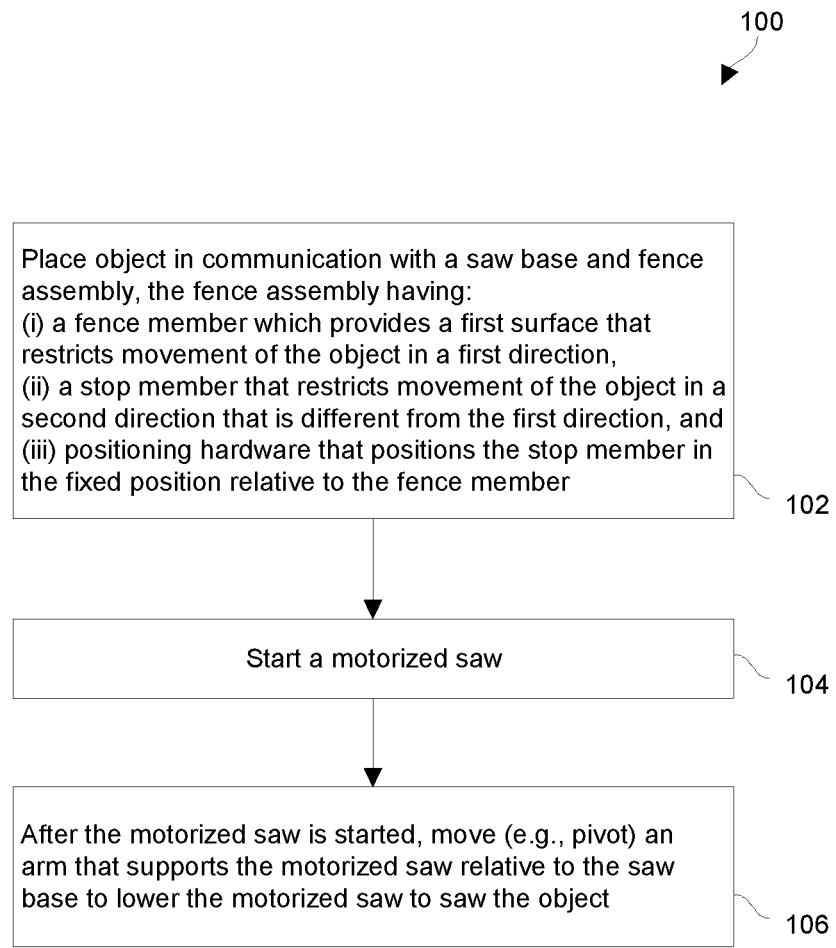
FIG. 8 is a flowchart of a procedure which utilizes a fence assembly in accordance with certain embodiments.

FIG. 8 is a flowchart of a procedure 100 which utilizes a fence assembly in accordance with certain embodiments. Such utilization enables a user to easily position an object on a saw system even if the object is not block-shaped.

At 102, the user places an object in communication with a saw base and a fence assembly. The fence assembly has:
(i) a fence member which provides a first surface that restricts movement of the object in a first direction,
(ii) a stop member that restricts movement of the object in a second direction that is different from the first direction, and
(iii) positioning hardware that positions the stop member in the fixed position relative to the fence member.

For example, as shown in FIG. 4, the object may be a piece of crown molding that the user wishes to cut. In such a situation, the user may hold the object in place simply using one hand.

At 104, the user starts a motorized saw. For example, while continuing to hold the object in place with a first hand, the user may start the motorized saw using a second hand.

At 106, after the motorized saw is started, the user moves an arm that supports the motorized saw relative to the saw base to move the motorized saw to saw the object. Here, the user may use the second hand to pivot the arm in order to bring the saw into contact with the object and cut the object.

It should be understood that, the user may adjust the stop member to accommodate objects of other shapes, sizes, geometries, etc. For example, after the motorized saw cuts the object, the user may actuate the positioning hardware relative to the stop member to move the stop member from the fixed position to another fixed position relative to the fence member. Accordingly, the user may then place another object in communication with the saw base and the fence assembly, re-start the motorized saw and move the arm that supports the motorized saw relative to the saw base to move the motorized saw to cut the other object. Such operation did not require extra clamps, jigs, etc. that would require additional skill and/or complicate the cutting process.

It should be further understood that the fence assembly may be provided as a kit that is removable and/or installable. For example, prior to placing the object in communication with the saw base and the fence assembly, the user may install the fence member on the saw base and actuate the positioning hardware to position the stop member in the fixed position relative to the fence member. Additionally, after making the cut, the user may easily remove the fence assembly for use on another saw if desired.

As described above, improved techniques are directed to utilizing a fence assembly 16 that provides surfaces at different angles against which a user may easily maintain position of an object 60 even if the object 60 is not block shaped. In particular, the fence assembly 16 in combination with a saw base 12 (e.g., a flat foundation or stand that supports a motorized saw 24) may provide several different surfaces (e.g., three flat walls) against which the user may hold an object 60 in place securely and without difficulty (e.g., with relatively little effort) before sawing the object 60.

While various embodiments of the present disclosure have been particularly shown and described, it will be understood by those skilled in the art that various changes in form and details may be made therein without departing from the spirit and scope of the present disclosure as defined by the appended claims.

For example, it should be understood that a variety of materials are suitable for use for the fence members 32 and/or stop members 34. In accordance with certain embodiments, the fence members 32 and/or the stop members 34 are made of a durable substance such as cast aluminum or similar material. In accordance with certain embodiments, each fence member 32 is cast, cut, routed and/or otherwise formed as a singular body (e.g., cast metal or similar rigid material).

Additionally, the fence members 32 may have a certain geometries to provide a balance of strength, stability, weight, maneuverability, etc. For example, in some arrangements, each fence member 32 is 3.75 inches tall (in the Y-direction) and 10 inches to 14 inches long (in the X-direction). In some arrangements, one fence member 32 is 10.5 inches long along the X-axis, and the other fence member 32 is 13 inches long along the X-axis (e.g., see FIG. 1).

In some arrangements, the fence members 32 are ⅛ inch to ½ inch thick along the Z-axis. For example, the fence members 32 may be ⅜ inch thick, and the widest portions of the slots 50 may be recessed by ⅛ inch from each fence member side 90 (e.g., centered within the fence members 32, also see FIG. 7) and ⅛ inch deep along the Z-axis.

Furthermore, the stop members 34 may have certain geometries to provide a balance of strength, stability, weight, maneuverability, etc. For example, in some arrangements, an elongated bar-shaped portion of each stop member 34 may have a ¼ inch square (or rectangular) cross-section and may be 3 inches long.

In some arrangements, the slots 50 defined by the fence members 32 are 2 inches apart. Also, the narrowest portion (or gap) of the slots 50 are ¼ inch wide.

Additionally, the positioning hardware 36 may take the form of a set of threaded knobs, thumb screws, twist tight knobs, etc. Alternatively, clamps, friction hinges, combinations thereof, and/or other fastening mechanisms are suitable for use as well.

Furthermore, in accordance with certain embodiments, each fence member 32 of the fence assembly 16 defines an edge (or interface) that fits into a slot of the saw base 12. Such a feature may enable the fence members 32 to fit in conventional sawing devices by simply replacing the fences of those sawing devices with the fence assembly 16 (e.g., the fence assembly 16 may be provided as a kit). As shown in at least some of the figures, the edge/interface extends perpendicularly relative to each slot 50.

In accordance with certain embodiments, the fence assembly 16 takes the form of a miter saw crown top fence with crown stop bar. The miter saw crown stop fence has the form factor of a typical miter saw fence but has two parallel T-grooves that are 2+/− inches apart within the face of the fence. The T-grooves are used in part with the crown stop bar. Together they make a crown molding stop.

Crown molding comes in many sizes. The crown stop fence adjusts to any size crown molding that fits against the fence. To use the stop bar, the user actuates positioning hardware (e.g., loosens a twist screw or similar hardware) and removes it from the back of the fence. The user then places the stop bar into the T-grooves on the front of the fence.

The user then places the crown molding against the fence in the desired position and against a stop on the saw base if such a stop exists or is available. Alternatively, the user positions the crown molding in place after adjusting to the position of the stop bar.

The user slides the stop bar down to the crown molding and tightens the twist screw. The stop bar will now stop the molding in the same exact position every time.

When done with the stop bars and positioning the crown molding, the user simply loosens the positioning hardware and returns them back to the side of the fence and tightens the positioning hardware.

In accordance with certain embodiments, the fence and the stop bar are made of aluminum or similar durable material. The crown stop fence may be for just one fence or both fences (left and right fences each having a stop bar). The stop bar moves freely up and down in the T-grooves for easy and micro adjustment. Because the stop bar is on the fence, it is unlikely to trap any saw dust. The crown stop fence never needs the use of external jigs, clamps or tools. The miter saw can still be used to make flat cuts without removal of the stop bar. Such details, modifications and enhancements are intended to belong to various embodiments of the disclosure.

What is claimed is:

1. A fence assembly, comprising:
  a fence member constructed and arranged to install on a miter saw base and provide a first surface that restricts movement of an object in a first direction when the fence member is installed on the miter saw base;
  a stop member constructed and arranged to provide a second surface that restricts movement of the object in a second direction that is different from the first direction when the stop member is in a fixed position relative to the fence member; and
  threaded positioning hardware constructed and arranged to position the stop member in the fixed position relative to the fence member;

wherein the fence member provides, as the first surface, a first plane and defines an edge;

wherein the stop member provides, as the second surface, a second plane that extends perpendicularly from the fence member when the threaded positioning hardware positions the stop member in the fixed position relative to the fence member;

wherein the fence member defines at least two vertical slots that extend in a perpendicular direction from the edge, the vertical slots having a T-shape and sized to receive at least a portion of the stop member;

wherein the stop member includes a bar portion and at least two engagement elements extending from the bar portion, the at least two engagement elements having a T-shape and arranged to slidably engage the vertical T-shaped slots defined by the fence member to adjust the vertical position of the stop member relative to the miter saw base;

wherein the at least two engagement elements include a first engagement element and a second engagement element, the threaded positioning hardware disposed between the first engagement element and the second engagement element; and wherein the threaded positioning hardware is constructed and arranged to thread completely through the bar portion in a first direction perpendicular to the first plane to engage the first surface of the fence member, the threaded positioning hardware forming a clamping structure with the first and second engaging elements to secure the stop member in the fixed position relative to the fence member.

2. A fence assembly as in claim 1 wherein the threaded positioning hardware is constructed and arranged to selectively (i) fasten the stop member to the fence member to maintain the stop member in the fixed position relative to the fence member and (ii) unfasten the stop member from the fence member to permit the stop member to move out of the fixed position relative to the fence member.

3. A fence assembly as in claim 2, wherein the edge is constructed and arranged to couple with the miter saw base.

4. A saw assembly as in claim 3 wherein the bar member provides the second surface.

5. A fence assembly as in claim 1, further comprising:
another fence member constructed and arranged to install on the miter saw base and provide an extension of the first surface that further restricts movement of the object in the first direction when the other fence member is installed on the miter saw base,
another stop member constructed and arranged to provide an extension of the second surface that restricts movement of the object in the second direction that is different from the first direction when the other stop member is in another fixed position relative to the other fence member, and
other threaded positioning hardware constructed and arranged to position the other stop member in the other fixed position relative to the other fence member.

6. A fence assembly as in claim 1 wherein the first and second engagement elements are constructed and arranged to keep the second plane parallel to the edge defined by the fence member when the first and second engagement elements engage with the fence member.

7. A saw system, comprising:
a miter saw base;
an arm constructed and arranged to move relative to the miter saw base to move a motorized saw relative to the miter saw base; and
a fence assembly having:
a fence member constructed and arranged to install on the miter saw base and provide a first surface that restricts movement of an object in a first direction when the fence member is installed on the miter saw base,
a stop member constructed and arranged to provide a second surface that restricts movement of the object in a second direction that is different from the first direction when the stop member is in a fixed position relative to the fence member, and
threaded positioning hardware constructed and arranged to position the stop member in the fixed position relative to the fence member;

wherein the fence member provides, as the first surface, a first plane that extends perpendicularly from the miter saw base when an edge defined by the fence member engages the miter saw base;

wherein the stop member provides, as the second surface, a second plane that extends perpendicularly from the fence member when the threaded positioning hardware positions the stop member in the fixed position relative to the fence member;

wherein the fence member defines at least two vertical slots that extend in a perpendicular direction from the edge, the vertical slots having a T-shape and sized to receive at least a portion of the stop member;

wherein the stop member includes a bar portion and at least two engagement elements extending from the bar portion, the at least two engagement elements having a T-shape and arranged to slidably engage the vertical T-shaped slots defined by the fence member to adjust the vertical position of the stop member relative to the miter saw base;

wherein the at least two engagement elements include a first engagement element and a second engagement element, the threaded positioning hardware disposed between the first engagement element and the second engagement element; and wherein the threaded positioning hardware is constructed and arranged to thread completely through the bar portion in a first direction perpendicular to the first plane to engage the first surface of the fence member, the threaded positioning hardware forming a clamping structure with the first and second engaging elements to secure the stop member in the fixed position relative to the fence member.

8. A saw system as in claim 7 wherein the threaded positioning hardware is constructed and arranged to selectively (i) fasten the stop member to the fence member to maintain the stop member in the fixed position relative to the fence member and (ii) unfasten the stop member from the fence member to permit the stop member to move out of the fixed position relative to the fence member.

9. A saw system as in claim 8 wherein the bar member provides the second surface.

10. A saw system as in claim 7 wherein the miter saw base defines a third plane; and
wherein, when the fence member engages the miter saw base and the stop member is positioned in the fixed position relative to the fence member, the second plane provided by the stop member faces the third plane.

11. A saw system as in claim 7 wherein the fence assembly further includes:
a second fence member constructed and arranged to install on the miter saw base and provide an extension of the first surface that further restricts movement of the object in the first direction when the second fence member is installed on the miter saw base,
a second stop member constructed and arranged to provide an extension of the second surface that restricts movement of the object in the second direction that is different from the first direction when the second stop member is in a second fixed position relative to the second fence member, and
second threaded positioning hardware constructed and arranged to position the second stop member in the second fixed position relative to the second fence member; and
wherein the arm, when moving relative to the miter saw base, is constructed and arranged to support the motorized saw at different cutting angles relative to the miter saw base and move the motorized saw between the fence members to operate as a miter saw.

12. A saw system as in claim 7 wherein the bar portion defines the second plane; and
wherein the multiple engagement elements couple with the bar portion, the multiple engagement elements being constructed and arranged to keep the second plane parallel to the edge defined by the fence member when the multiple engagement elements engage with the fence member.

13. A saw system as in claim 12 wherein the multiple engagement elements include:
a first engagement element and a second engagement element which extend in a same direction from the bar portion to the fence member when the multiple engagement elements engage with the fence member; and
wherein the threaded positioning hardware extends through the bar portion and is disposed between the first engagement element and the second engagement element.

14. A method of sawing an object, the method comprising:
(A) placing an object in communication with a miter saw base and a fence assembly, the fence assembly having:
(i) a fence member installed on the miter saw base and providing a first surface that restricts movement of the object in a first direction,
(ii) a stop member providing a second surface that restricts movement of the object in a second direction that is different from the first direction, and
(iii) threaded positioning hardware that positions the stop member in the fixed position relative to the fence member;
(B) starting a motorized saw; and
(C) after the motorized saw is started, moving an arm that supports the motorized saw relative to the miter saw base to move the motorized saw to saw the object;
wherein the fence member provides, as the first surface, a first plane that extends perpendicularly from the miter saw base when an edge defined by the fence member engages the miter saw base;
wherein the stop member provides, as the second surface, a second plane that extends perpendicularly from the fence member when the threaded positioning hardware positions the stop member in the fixed position relative to the fence member;
wherein the fence member defines at least two vertical slots that extend in a perpendicular direction from the edge, the vertical slots having a T-shape and sized to receive at least a portion of the stop member;
wherein the stop member includes a bar portion and at least two engagement elements extending from the bar portion, the at least two engagement elements having a T-shape and arranged to slidably engage the vertical T-shaped slots defined by the fence member to adjust the vertical position of the stop member relative to the miter saw base;
wherein the at least two engagement elements include a first engagement element and a second engagement element, the threaded positioning hardware disposed between the first engagement element and the second engagement element; and
wherein the threaded positioning hardware is constructed and arranged to thread completely through the bar portion in a first direction perpendicular to the first plane to engage the first surface of the fence member, the threaded positioning hardware forming a clamping structure with the first and second engaging elements to secure the stop member in the fixed position relative to the fence member.

15. A method as in claim 14, further comprising:
after the motorized saw saws the object, actuating the threaded positioning hardware relative to the stop member to move the stop member from the fixed position to another fixed position relative to the fence member; and
placing another object in communication with the miter saw base and the fence assembly, re-starting the motorized saw and moving the arm that supports the motorized saw relative to the miter saw base to move the motorized saw to saw the other object.

16. A method as in claim 14, further comprising:
prior to placing the object in communication with the miter saw base and the fence assembly, installing the fence member on the miter saw base and actuating the threaded positioning hardware to position the stop member in the fixed position relative to the fence member.

* * * * *